(12) United States Patent
Jin et al.

(10) Patent No.: US 10,763,520 B2
(45) Date of Patent: Sep. 1, 2020

(54) SEPARATOR FOR FUEL CELL

(71) Applicants: Hyundai Motor Company, Seoul (KR); Kia Motors Corporation, Seoul (KR)

(72) Inventors: Sang Mun Jin, Gyeonggi-Do (KR); Kyung Min Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 147 days.

(21) Appl. No.: 16/163,882

(22) Filed: Oct. 18, 2018

(65) Prior Publication Data

US 2019/0348689 A1    Nov. 14, 2019

(30) Foreign Application Priority Data

May 14, 2018 (KR) .......................... 10-2018-0054784

(51) Int. Cl.
*H01M 8/0258*  (2016.01)
*H01M 8/04089*  (2016.01)
*H01M 8/04746*  (2016.01)

(52) U.S. Cl.
CPC ..... *H01M 8/0258* (2013.01); *H01M 8/04089* (2013.01); *H01M 8/04746* (2013.01)

(58) Field of Classification Search
None
See application file for complete search history.

(56) References Cited

U.S. PATENT DOCUMENTS

| 5,998,055 | A | * | 12/1999 | Kurita | H01M 8/0247 |
| | | | | | 429/480 |
| 2001/0005557 | A1 | * | 6/2001 | Yosida | H01M 8/0258 |
| | | | | | 429/413 |
| 2005/0214626 | A1 | * | 9/2005 | Ohma | H01M 8/1007 |
| | | | | | 429/414 |
| 2017/0346105 | A1 | * | 11/2017 | Baeck | H01M 8/1004 |
| 2018/0183076 | A1 | * | 6/2018 | Elder | H01M 8/1004 |

FOREIGN PATENT DOCUMENTS

| JP | 2009-0199882 A | 9/2009 |
| JP | 4812920 B2 | 11/2011 |
| JP | 5079994 B2 | 11/2012 |
| JP | 5918037 B2 | 5/2016 |

* cited by examiner

*Primary Examiner* — Rena Dye Cronin
(74) *Attorney, Agent, or Firm* — Mintz Levin Cohn Ferris Glovsky and Popeo, P.C.; Peter F. Corless

(57) ABSTRACT

A separator for a fuel cell allows air to bypass a diffusion part, which is frequently exposed to air, and thus flow directly to a reaction surface, which can reduce deterioration of a polymer electrolyte membrane. The separator includes a separator main body having a diffusion part formed thereon that is configured to allow air to be diffused and supplied from an air inlet manifold to the reaction surface; and a gasket line formed on the separator main body and surrounding the air inlet manifold and the reaction surface to maintain airtightness. The separator main body or the gasket line includes a bypass flow path formed thereon so as to allow air supplied from the air inlet manifold to flow directly to the reaction surface without passing through the diffusion part.

9 Claims, 5 Drawing Sheets

<Prior Art>

SEPARATOR FOR FUEL CELL

CROSS REFERENCE TO RELATED APPLICATION

The present application claims under 35 U.S.C. § 119(a) the benefit of Korean Patent Application No. 10-2018-0054784, filed on May 14, 2018, the entire contents of which are incorporated by reference herein.

BACKGROUND

(a) Technical Field

The present disclosure relates to a separator for a fuel cell, more particularly, to the separator that is capable of allowing air to bypass a diffusion part, and thus flow directly to a reaction surface, which can reduce a phenomenon of deterioration of a polymer electrolyte membrane.

(b) Description of the Related Art

A fuel cell is a type of power generation device that electrochemically reacts fuel in a stack to convert chemical energy of the fuel into electrical energy, and thus the fuel cell can supply driving power for industrial use, home use, and vehicles, and further can be used for supplying power to small electronic products such as portable devices. Recently, uses of the fuel cell have been gradually expanding as a highly efficient and clean energy source.

In a conventional fuel cell stack, a membrane electrode assembly (MEA) is located in the innermost side, and the electrode membrane assembly includes a polymer electrolyte membrane capable of transporting hydrogen positive ion (protons) and catalyst layers applied on both surfaces of the electrolyte membrane to allow oxygen and hydrogen to be reacted with each other, that is, a fuel electrode (anode) and an air electrode (cathode).

In addition, a gas diffusion layer (GDL) is laminated on an outer side of the membrane electrode assembly, that is, the outer side where the fuel electrode and the air electrode are placed, a separator on which a flow path configured to supply fuel and discharge water generated by a reaction is formed is disposed on an outer side of the gas diffusion layer, and an end plate for supporting and fixing the above-described respective components is disposed at the outermost side. Further, a gasket is formed in various patterns in order to hermetically keep hydrogen and oxygen (air) flowing on the separator.

The separator is generally manufactured to have a structure in which a land serving as a support and a channel (flow path) becoming as a fluid flow passage are repeatedly formed.

That is, since a conventional separator has a structure in which lands and channels are repeatedly bent, a channel on one side facing the gas diffusion layer is utilized as a space through which reaction gas such as hydrogen or air flows, and an opposite channel is simultaneously utilized as a space through which coolant flows, so that it is possible to make one unit cell using two separators in total including one sheet of separator having a hydrogen/coolant channel and one sheet of separator having an air/coolant channel.

FIG. 1 (PRIOR ART) is a view showing a conventional separator.

As illustrated in FIG. 1, a separator 10 according to the prior art has inlet manifolds 11a, 11b and 11c and outlet manifolds (not shown) formed on both edges thereof, respectively, and reaction gas and coolant flow into the separator through the inlet manifolds and are discharged from the separator through the outlet manifolds. For example, as illustrated in FIG. 1, the air inlet manifold 11a, the coolant inlet manifold 11b, and the hydrogen inlet manifold 11c configured to allow air (oxygen), coolant and hydrogen to flow into the separator are formed on one side of the separator 10. In addition, although not shown in FIG. 1, the air outlet manifold, the coolant outlet manifold and the hydrogen outlet manifold configured to discharge air (oxygen), coolant and hydrogen are formed on the other side of the separator 10. Further, the separator 10 has a reaction surface 13 formed thereon, and the reaction surface is a region corresponding to a membrane electrode assembly and is connected to the inlet manifolds 11a, 11b and 11c formed on the one side and the outlet manifolds (not shown) formed on the other side. In addition, a diffusion part 12 is formed between the reaction surface 13 and each of the inlet manifolds 11a, 11b and 11c, and the diffusion parts diffuse air (oxygen), coolant and hydrogen flowing into the inlet manifolds 11a, 11b and 11c and then supply them to the reaction surface 13, respectively.

Further, a plurality of air inlet holes 14 configured to allow air flowing from the air inlet manifold 11a to flow to the diffusion part 12 are formed on the separator 10. In addition, a plurality of diffusion flow paths 12b configured to allow air flowing from the air inlet manifold 11a to be diffused and flow to the reaction surface 13 are formed on the diffusion part 12. In particular, a land 12a and a channel are formed by bending the diffusion part 12 to form the diffusion flow path 12b, and the channel formed as described above becomes the diffusion flow path 12b.

Further, a gasket line 20 is formed on a surface of the separator 10, and the gasket line surrounds the inlet manifolds 11a, 11b and 11c formed on the one side of the separator, the outlet manifolds (not shown) formed on the other side of the separator, the diffusion part 12 and the reaction surface 13 to maintain airtightness when air, coolant and hydrogen flow.

On the other hand, since air flowing from the air inlet manifold 11a is diffused in the diffusion part 12 and then supplied to the reaction surface 13, a distribution of air supplied to the reaction surface 13 is relatively uniform. To this end, however, the diffusion flow paths 12b formed on the diffusion part 12 are formed to have a variety of lengths.

As a difference in the lengths of the diffusion flow paths 12b occurs as above, when air is instantaneously supercharged (rapidly accelerated) or during long-term parking, frequency of exposing a region, where the diffusion flow path 12b is relatively short, to air is increased. For this reason, there is a problem that, in a region A of the diffusion part 12, in which the diffusion flow path 12b is short, deterioration of the membrane electrode assembly progresses more rapidly than other regions. The reason why the deterioration of the membrane electrode assembly progresses more rapidly in the region A which is more frequently exposed to air is that air partial pressure of the corresponding region is increased by excess air, the amount of air which is crossed-over to a hydrogen side is thus increased, and a high-potential is formed in the corresponding region due to increased air.

SUMMARY

The present disclosure provides a separator for a fuel cell, which is capable of allowing air to bypass a diffusion part, and thus flow directly to a reaction surface, which can reduce a phenomenon of deterioration of a polymer electrolyte membrane.

A separator for a fuel cell according to one embodiment of the present disclosure may include a separator main body having a diffusion part formed thereon and configured to allow air to be diffused and supplied from an air inlet manifold to a reaction surface; and a gasket line formed on a surface of the separator main body and surrounding the air inlet manifold and the reaction surface to maintain airtightness. Here, at least the separator main body or the gasket line may have a bypass flow path formed thereon so as to allow air supplied from the air inlet manifold to flow directly to the reaction surface without passing through the diffusion part The diffusion part may have a plurality of diffusion flow paths formed thereon so as to allow air to be diffused and flow from the air inlet manifold to the reaction surface, and the bypass flow path may be formed at a position adjacent to the diffusion flow path having the shortest length among the plurality of diffusion flow paths to allow a part of air supplied to a region in which the shortest-length diffusion flow path is formed, to flow directly to the reaction surface.

The separator main body may include a plurality of air inlet holes formed thereon so as to allow air from the air inlet manifold to flow to the diffusion part and a bypass hole formed thereon so as to allow air from the air inlet manifold to flow to the bypass path, and the bypass hole may be formed to have a cross-sectional area larger than that of the air inlet hole connected to the shortest-length diffusion flow path among the air inlet holes.

At least the separator main body or the gasket line may include a flow path partition part formed thereon blocking a space between the reaction surface and the bypass flow path so as to form the bypass flow path.

The flow path partition part may be a partition protrusion formed by protruding a region between the reaction surface and the bypass flow path of the separator main body in a concave-convex shape.

The flow path partition part may be a gasket partition line extending from the gasket line to a region between the reaction surface and the bypath flow path.

The bypass flow path may have one or more bypass outlet ports configured to allow air to flow to the reaction surface, the one or more bypass outlet ports being spaced apart from each other in a direction in which air flows on the reaction surface.

The plurality of bypass flow paths may be individually formed so as to be adjacent to the diffusion flow path having the shortest length among the plurality of diffusion flow paths, each bypass flow path may have the bypass outlet port formed thereon and configured to allow air to flow to the reaction surface, and the bypass outlet ports formed on the bypass flow paths, respectively, are spaced apart from each other in a direction in which air flows on the reaction surface.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF PREFERRED EMBODIMENTS

Figure 1:
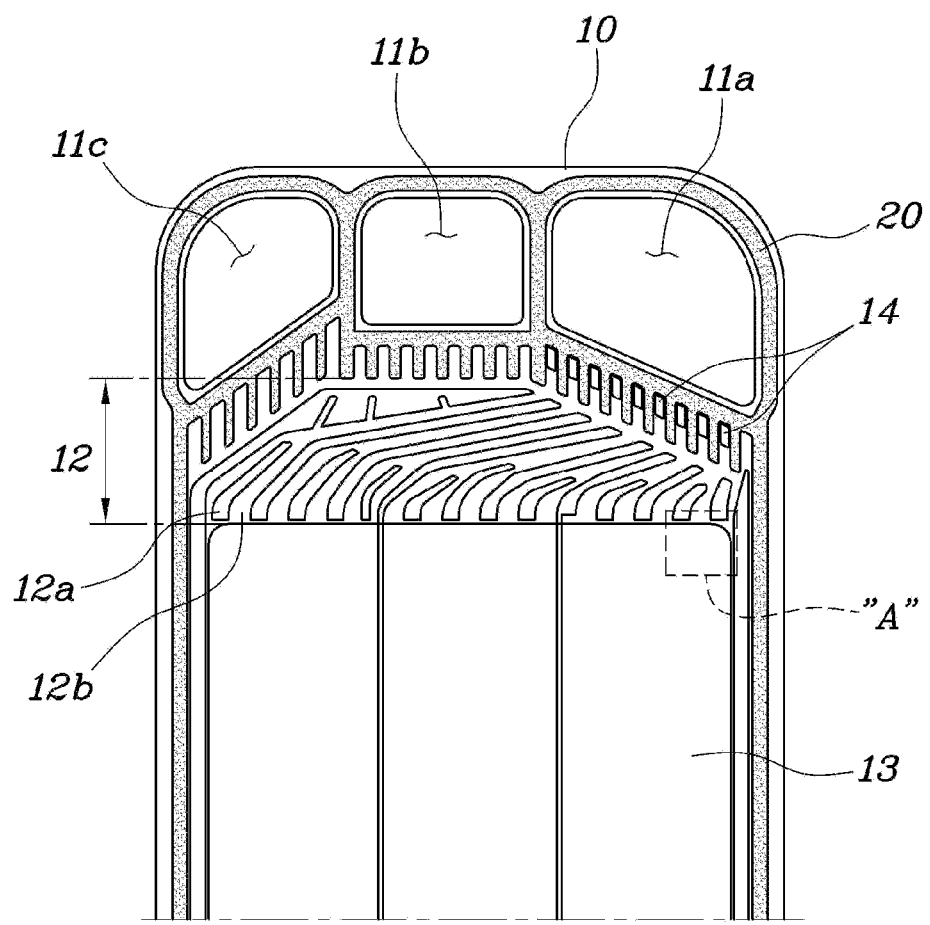
FIG. 1 (PRIOR ART) is a view showing a conventional separator.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. However, the present disclosure is not limited to the embodiments disclosed below and will be embodied in different forms which differ from each other, and these embodiments merely make the disclosure of the present disclosure complete and provide for fully informing the scope of the disclosure to those skilled in the art. In the drawings, like reference numerals refer to like elements.

A separator for a fuel cell according to one embodiment of the present disclosure is a separator for solving the problem caused by a relatively high frequency of exposure to air, and it is preferable that the separator according to one embodiment of the present disclosure is applied to a cathode separator disposed on an air electrode (cathode) side which guides a flow of air. Of course, the separator for a fuel cell according to one embodiment of the present disclosure is not limited to being applied to only the cathode separator, and the technical spirit of the present disclosure may be applied to an anode separator. Hereinafter, the separator for a fuel cell according one embodiment of the present disclosure will be described by taking the cathode separator as an example.

Figure 2:
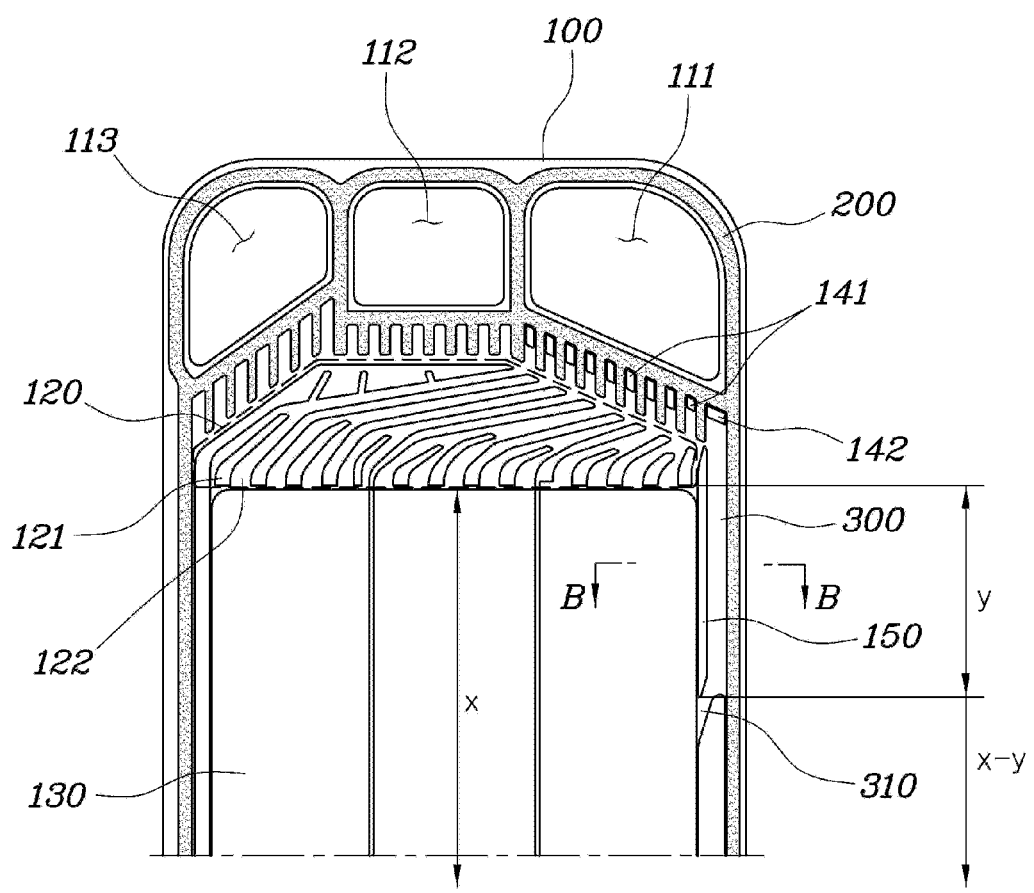
FIG. 2 is a view showing a separator for a fuel cell according to one embodiment of the present disclosure.
Figure 3:
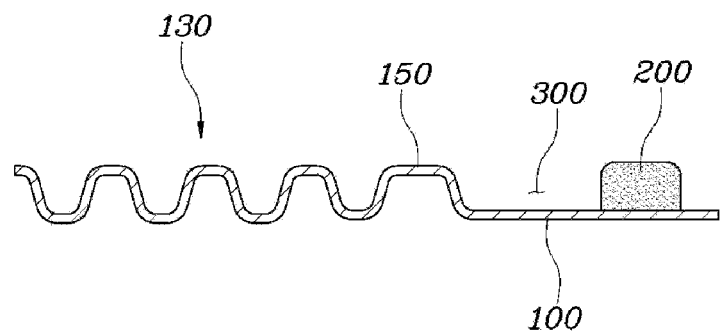
FIG. 3 is a cross-sectional view showing a cross-section taken along line B-B in FIG. 2.

FIG. 2 is a view showing a separator for a fuel cell according to one embodiment of the present disclosure, and FIG. 3 is a cross-sectional view showing a cross-section taken along line B-B in FIG. 2.

As illustrated in the drawings, a separator for a fuel cell according to one embodiment of the present disclosure is a separator including a separator main body 100 on which a diffusion part 120 is formed that is configured to diffuse and supply air from an air inlet manifold 111 to a reaction surface 130, and a gasket line 200 is formed on a surface of the separator main body 100 and provided to surround the air inlet manifold 111 and the reaction surface 130 for maintaining airtightness. At least the separator main body 100 or the gasket line 200 is provided with a bypass flow path 300 formed thereon and configured to allow air supplied from the air inlet manifold 111 to flow directly to the reaction surface 130 without passing through the diffusion part 120. In other words, the bypass flow path 300 can be formed on the separator main body 100 and/or the gasket line 200.

Similar to a conventional separator, the air inlet manifold 111, a coolant inlet manifold 112 and a hydrogen inlet manifold 113 configured to allow air (oxygen), coolant and hydrogen to flow into the separator main body 100, respectively, are formed on one side of the separator main body 100. Although not illustrated in FIG. 2, in addition, an air outlet manifold, a coolant outlet manifold and a hydrogen outlet manifold configured to discharge air (oxygen), coolant and hydrogen, respectively, are formed on the other side of the separator main body 100. In addition, the separator main body 100 has the reaction surface 130 formed thereon, and the reaction surface is a region corresponding to a membrane electrode assembly and connected to the inlet manifolds 111, 112 and 113 formed on the one side and the outlet manifolds (not shown) formed on the other side. Further, the diffusion part 120 is formed between the reaction surface 130 and each of the inlet manifolds 111, 112 and 113, and the diffusion parts diffuse air (oxygen), coolant and hydrogen flowing into the inlet manifolds 111, 112 and 113 and then supply them to the reaction surface 130, respectively.

In addition, a plurality of air inlet holes 141 configured to allow air flowing from the air inlet manifold 111 to flow to the diffusion part 120 are formed on the separator main body 100. On the diffusion part 120, in addition, a plurality of diffusion flow paths 122 configured to allow air supplied from the air inlet manifold 111 through the plurality of air inlet holes 141 to be diffused and flow to the reaction surface 130 are formed. In particular, a land 121 and a channel are formed by bending the diffusion part 120 to form the diffusion flow path 122, and the channel formed as described above becomes the diffusion flow path 122.

The gasket line 200 is formed on a surface of the separator main body 100 to surround the inlet manifolds 111, 112 and 113, the outlet manifolds (not shown), the diffusion part 120 and the reaction surface 130, thereby maintaining airtightness when air, coolant and hydrogen flow. In particular, the gasket line is formed to maintain the airtightness while guiding the flow of air.

The bypass flow path 300 is a flow path configured to bypass a part of air concentrated to a corresponding region and to flow directly to the reaction surface 130, without passing through the diffusion part 120, in order to prevent a region having the diffusion flow path with a relatively short length to be excessively exposed to air when air is instantaneously supercharged (rapidly accelerated) or during long-term parking. In this embodiment, a region having the short-length diffusion flow path 122 corresponds to a region on which the diffusion flow path 122 formed on the rightmost side among the diffusion flow paths 122 shown in FIG. 2 is disposed. Accordingly, the bypass flow path 300 is disposed on the right of the diffusion flow path 122 formed on the rightmost side so as to be adjacent to the diffusion flow path 122 formed on the rightmost side among the diffusion flow paths 122. As a result, it is preferable that the bypass flow path 300 is formed along an edge of the diffusion part 120 and an edge of the reaction surface 130.

In addition, at a position adjacent to the air inlet hole 141 which is in communication with the diffusion flow path 122 having the shortest length among the plurality of air inlet holes 141 formed on the separator main body 100, a bypass hole 142 is formed that is configured to allow air flowing from the air inlet manifold 111 to flow to the bypass flow path 300. In this embodiment, the bypass hole 142 is formed on the right of the air inlet hole 141 positioned at the rightmost side in the drawing.

The bypass hole 142 is preferably formed to have a cross-sectional area larger than that of the air inlet hole 141 connected to the shortest-length diffusion flow path 122 among the air inlet holes 141. Therefore, it is possible to suppress air from being excessively exposed to the shortest-length diffusion flow path 122.

On the other hand, in order to form the bypass flow path 300, a flow path partition part blocking a space between the reaction surface 130 and the bypass flow path 300 is formed on at least any one of the separator main body 100 and the gasket line 200.

In this embodiment, the flow path partition part is formed in the separator main body 100, and as illustrated in FIGS. 2 and 3, the flow path partition part may be embodied as a partition protrusion 150 formed by protruding a region between the reaction surface 130 and the bypass flow path 300 of the separation main body 100 in a concave-convex shape, like the method of forming the land 121 formed on the diffusion part 120.

However, the partition protrusion 150 is formed to have a predetermined length shorter than that of the reaction surface 130 so that a bypass outlet port 310 through which air flowing into the bypass flow path 300 is supplied to the reaction surface 130 is formed at a point where the partition protrusion 150 is terminated.

It is preferable to calculate a length of the bypass flow path 300 in consideration of the total amount of air supply for the fuel cell, the amount of air supply per unit diffusion flow path 122, the amount of air supply required for a section of the bypass flow path 300, the amount of air supply required for a section other than the section of the bypass flow path 300, an air differential pressure of the bypass flow path 300, and the like. In this embodiment, a length y of the bypass flow path 300 is set to ⅓ to ½ of the total length x of the reaction surface 130 in consideration of the above described various factors and an area utilization ratio of the separator.

Figure 4:
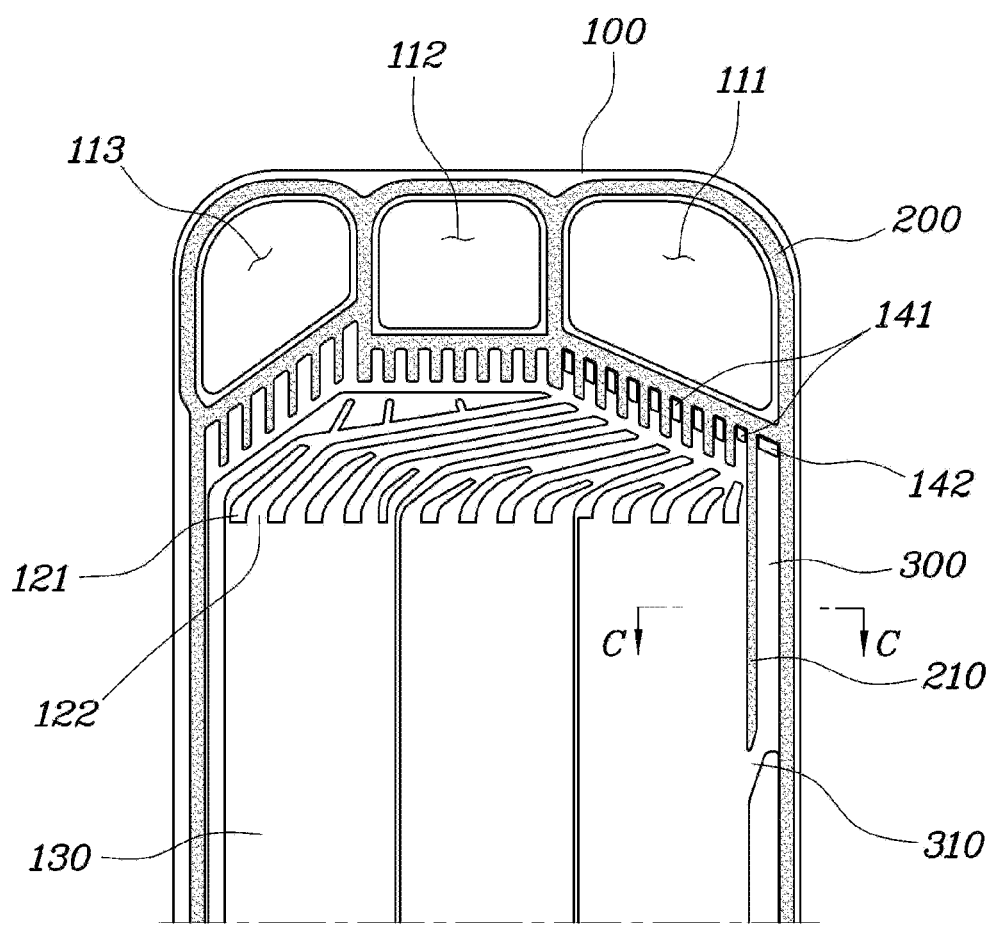
FIG. 4 is a view showing a separator for a fuel cell according to another embodiment of the present disclosure.
Figure 5:
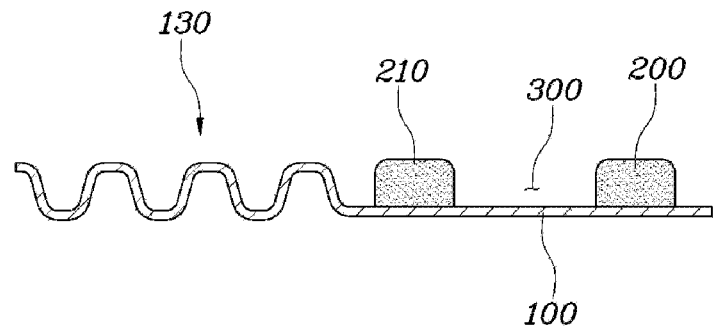
FIG. 5 is a cross-sectional view showing a cross-section taken along line C-C in FIG. 4.

Meanwhile, as described above, the flow path partition part may be formed on at least any one of the separator main body and the gasket line, and FIGS. 4 and 5 show that the flow path partition part is formed on the gasket line FIG. 4 is a view showing a separator for a fuel cell according to another embodiment of the present disclosure, and FIG. 5 is a cross-sectional view showing a cross-section taken along line C-C in FIG. 4.

Similar to the separator disclosed in the above-described embodiment, as illustrated in FIGS. 4 and 5, a separator for a fuel cell according to another embodiment of the present disclosure includes the separator main body 100 and the gasket line 200, and the flow path partition part, which forms the bypass flow path 300 configured to allow air supplied from the air inlet manifold 111 to flow directly to the reaction surface 130 without passing through the diffusion part 120, is formed on the gasket line 200.

The flow path partition part may be embodied as a gasket partition line 210 extending from the gasket line 200 to a region between the reaction surface 130 and the bypass flow path 300.

The gasket partition line 210 is formed to pass through a space between the air inlet hole 141 formed on the rightmost side and the bypass hole 142 and extend along an edge of the reaction 130. Here, the above-mentioned air inlet hole formed on the rightmost side is the air inlet hole 141 connected to the shortest-length diffusion flow path 122 on the gasket line 220 formed between the air inlet manifold 111 and each of the air inlet holes 141.

Similar to the partition protrusion 150 in the above-described embodiment, the gasket partition line 210 is formed to have a length shorter than that of the reaction surface 130 so that the bypass outlet port 310 through which air flowing into the bypass flow path 300 is supplied to the reaction surface 130 is formed at a point where the gasket partition line 210 is terminated.

Meanwhile, the number of the bypass flow path and the bypass outlet ports may be variously modified and embodied in consideration of the area utilization ratio of the separator.

Figure 6:
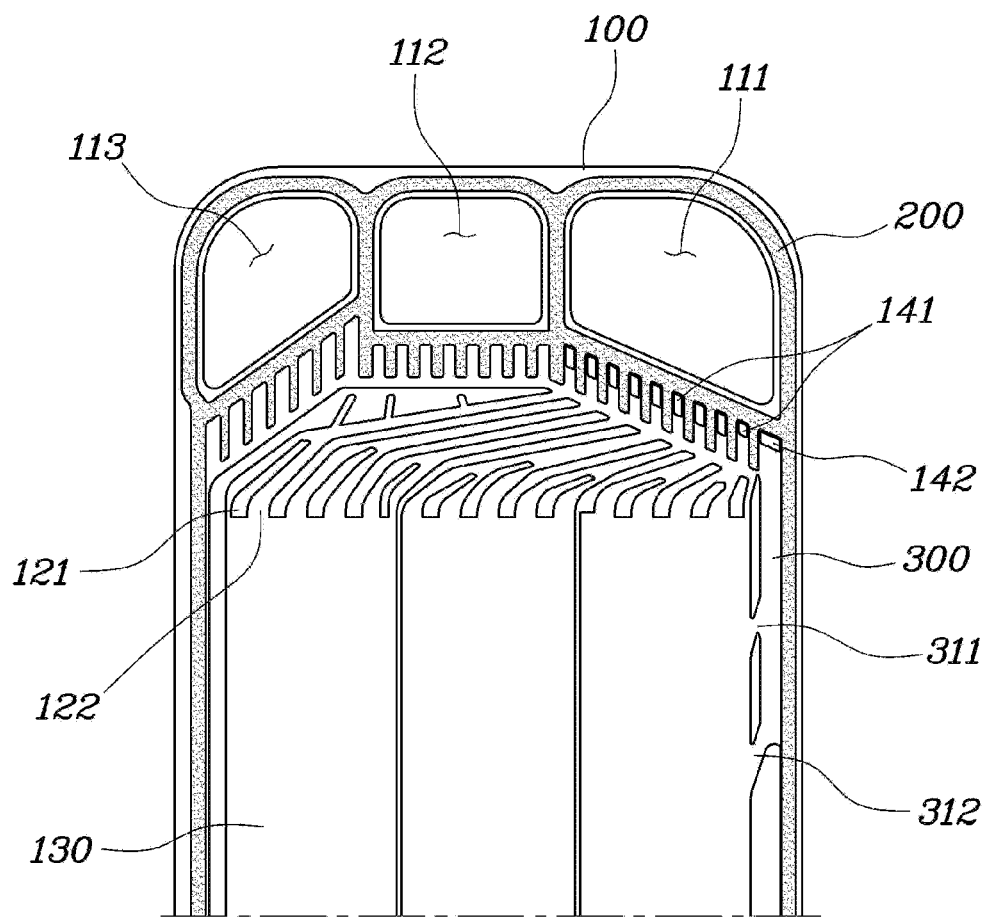
FIGS. 6 and 7 are views showing a separator for a fuel cell according to yet another embodiment of the present disclosure.
Figure 7:
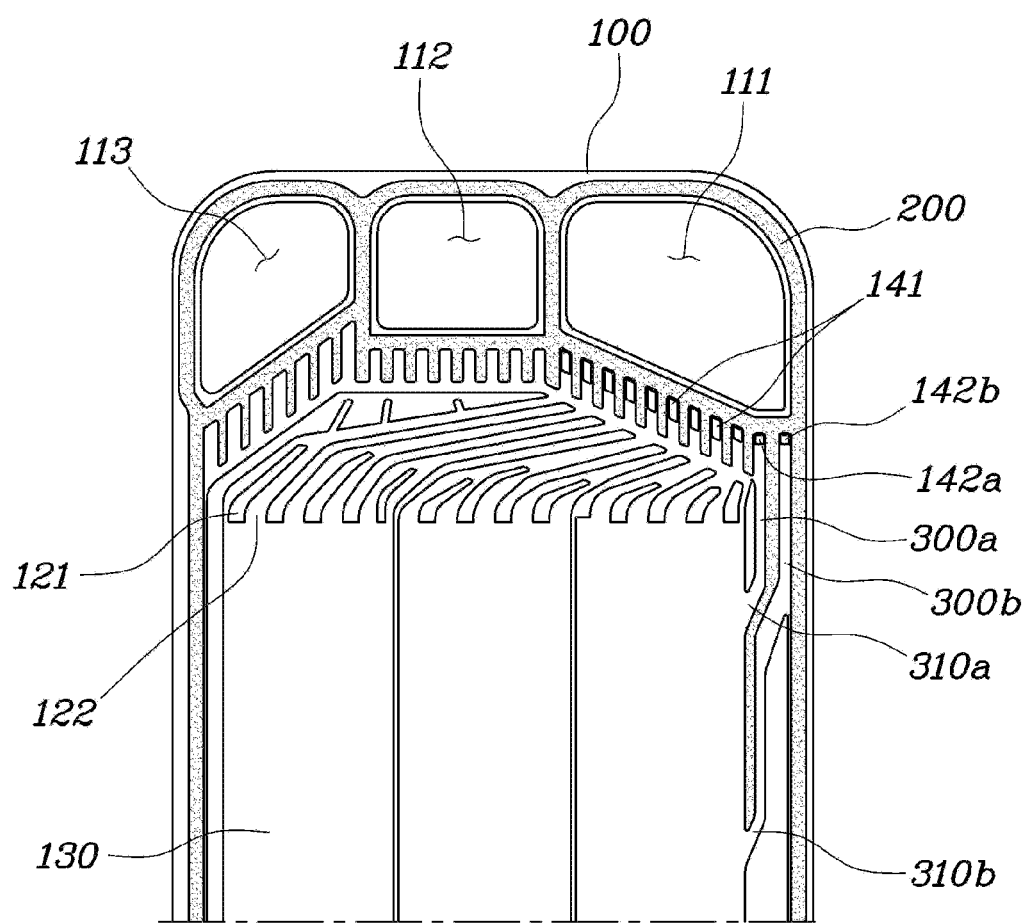

FIGS. 6 and 7 are views showing a separator for a fuel cell according to yet another embodiment of the present disclosure.

A separator for a fuel cell illustrated in FIG. 6 is a modified example in which a plurality of bypass outlet ports 311 and 312 are formed on one bypass flow path 300, and the plurality of bypass outlet ports 311 and 3112 configured to discharge air to the reaction surface 130 are formed on the bypass flow path 300 and spaced apart from each other in a direction in which air flows on the reaction surface 130. Although the configuration in which the number of the bypass outlet ports 311 and 312 is two has been exemplarily illustrated and described in the present embodiment, the number of the bypass outlet ports 311 and 312 may be two or more.

Although, in the present embodiment, the flow path partition part for forming the bypass flow path 300 is embodied as the partition protrusion obtained by modifying the separator main body 100, the present disclosure is not limited thereto and the flow path partition part may also be embodied as the gasket partition line obtained by modifying the gasket line 200.

In addition, the separator for a fuel cell illustrated in FIG. 7 is a modified example in which the plurality of bypass flow paths are formed. In this example, a plurality of bypass flow paths 300a and 300b are individually formed so as to be adjacent to the diffusion flow path 122 having the shortest length among the plurality of diffusion flow paths 122, and the bypass flow paths 300a and 300b have bypass outlet ports 310a and 310b, respectively, formed thereon and configured to allow air to flow to the reaction surface 130.

In particular, it is preferable that the bypass outlet ports 310a and 310b formed on the bypass flow paths 300a and 300b, respectively, are spaced apart from each other in a direction in which air flows on the reaction surface 130.

In addition, it is preferable that bypass holes 142a and 142b configured to allow air to flow from the air inlet manifold 111 to the respective bypass flow paths 300a and 300b are also formed to correspond the bypass flow paths 300a and 300b, respectively.

Although, in the present embodiment, the flow path partition part for forming the bypass flow path 300 is embodied by using both the partition protrusion obtained by modifying the separator main body 110 and the gasket line 200 obtained by modifying the gasket line 200, the present disclosure is not limited thereto, and the partition protrusion and the gasket partition line may be used alone to implement the flow path partition part.

According to the embodiments of the present disclosure, there is an advantage that the bypass flow path is formed in the region, which is frequently exposed to air due to the relative short-length diffusion flow path of the diffusion flow paths formed on the diffusion part, so that it is possible to prevent the corresponding region from being excessively exposed to air, thereby reducing a phenomenon of deterioration of the polymer electrolyte membrane.

Although the present disclosure has been described with reference to the accompanying drawings and the preferred embodiments described above, the present disclosure is not limited thereto but is limited by the following claims. Accordingly, those skilled in the art may variously modify and changes the present disclosure without departing from the technical spirit of the following claims.

What is claimed is:

1. A separator for a fuel cell, comprising:
   a separator main body having a diffusion part formed thereon and configured to allow air to be diffused and supplied from an air inlet manifold to a reaction surface; and
   a gasket line formed on a surface of the separator main body and surrounding the air inlet manifold and the reaction surface to maintain airtightness,
   wherein at least the separator main body or the gasket line has a bypass flow path formed thereon so as to allow air supplied from the air inlet manifold to flow directly to the reaction surface without passing through the diffusion part.

2. The separator according to claim 1, wherein:
   the diffusion part has a plurality of diffusion flow paths formed thereon so as to allow air to be diffused and flow from the air inlet manifold to the reaction surface, and
   the bypass flow path is formed at a position adjacent to the diffusion flow path having the shortest length among the plurality of diffusion flow paths to allow a part of air supplied to a region in which the shortest-length diffusion flow path is formed, to flow directly to the reaction surface.

3. The separator according to claim 1, wherein the bypass flow path is formed at a position adjacent to a region in which a distance between the air inlet manifold and the reaction surface is shortest, to allow a part of air supplied to the region in which a distance between the air inlet manifold and the reaction surface is shortest, to flow directly to the reaction surface.

4. The separator according to claim 1, wherein:
the separator main body has a plurality of air inlet holes formed thereon so as to allow air from the air inlet manifold to flow to the diffusion part and a bypass hole formed thereon so as to allow air from the air inlet manifold to flow to the bypass path, and
the bypass hole is formed to have a cross-sectional area larger than that of the air inlet hole connected to the shortest-length diffusion flow path among the air inlet holes.

5. The separator according to claim 1, wherein at least the separator main body or the gasket line has a flow path partition part formed thereon blocking a space between the reaction surface and the bypass flow path so as to form the bypass flow path.

6. The separator according to claim 5, wherein the flow path partition part is a partition protrusion formed by protruding a region between the reaction surface and the bypass flow path of the separator main body in a concave-convex shape.

7. The separator according to claim 5, wherein the flow path partition part is a gasket partition line extending from the gasket line to a region between the reaction surface and the bypath flow path.

8. The separator according to claim 1, wherein the bypass flow path has one or more bypass outlet ports configured to allow air to flow to the reaction surface, the one or more bypass outlet ports being spaced apart from each other in a direction in which air flows on the reaction surface.

9. The separator according to claim 1, wherein:
the plurality of bypass flow paths are individually formed so as to be adjacent to the diffusion flow path having the shortest length among the plurality of diffusion flow paths, and each bypass flow path has the bypass outlet port formed thereon and configured to allow air to flow to the reaction surface, and
the bypass outlet ports formed on the bypass flow paths, respectively, are spaced apart from each other in a direction in which air flows on the reaction surface.

\* \* \* \* \*